United States Patent [19]
Catlin

[11] Patent Number: 5,226,047
[45] Date of Patent: Jul. 6, 1993

[54] IN-CIRCUIT EMULATION OF A MICROPROCESSOR MOUNTED ON A CIRCUIT BOARD

[75] Inventor: Robert W. Catlin, Santa Clara, Calif.

[73] Assignee: Chips and Technologies, Inc., San Jose, Calif.

[21] Appl. No.: 592,154

[22] Filed: Oct. 3, 1990

[51] Int. Cl.⁵ .......................................... G06F 11/00
[52] U.S. Cl. ............................... 371/16.2; 364/232.3; 364/267.91; 364/232.8
[58] Field of Search .................. 371/16.2, 23; 364/232.3 MS File, 267.91 MS File, 232.8 MS File

[56] References Cited

U.S. PATENT DOCUMENTS

| | | | |
|---|---|---|---|
| 4,901,259 | 2/1990 | Watkins | 371/23 |
| 4,939,637 | 7/1990 | Pawloski | 364/200 |
| 4,964,074 | 10/1990 | Suzuki et al. | 364/900 |

OTHER PUBLICATIONS

"Emulators for Microprocessor System Development" by Donnelly et al. 1980 Hewlett Packard Journal pp. 13-20.
"Microprocessor-Based Design" by M. Slater pp. 52-54, 1987.
"ICE-286 In-Circuit Emulator"; *Intel;* pp. 48-49.
Microcosm, Inc.; "Chapter One—Introduction"; ICE-386 User Manual, pp. 51-53.
3M Electronic Specialty Products; "Surface Mount Test Clip"; p. 258.

*Primary Examiner*—Robert W. Beausoliel, Jr.
*Assistant Examiner*—Phung My Chung
*Attorney, Agent, or Firm*—Townsend and Townsend

[57] ABSTRACT

In-circuit emulation of a processor that is mounted on a circuit board. The processor (20) is provided with isolation circuitry wherein a particular input signal regime causes all processor outputs to be disabled. The emulator cable (60) terminates in a set of contacts (62a-d, 75) configured to engage the processor pins (12a-d, 25). In the special case of a surface-mount processor, the contacts are mounted to fit over and around the processor and are spring-loaded. Provision is made via at least one of the probe contacts (75) to establish the specific input signal regime at the appropriate processor pin(s) (25) in order to isolate the processor pins from any processor output signals. This prevents any processor output signals from reaching the emulator or the rest of the board logic, thereby allowing the emulator to operate.

10 Claims, 2 Drawing Sheets

IN-CIRCUIT EMULATION OF A MICROPROCESSOR MOUNTED ON A CIRCUIT BOARD

BACKGROUND OF THE INVENTION

The present invention relates generally to microprocessors, and more specifically to techniques for in-circuit emulation thereof.

A typical microcomputer system includes one or more printed circuit boards, one of which has a microprocessor chip (the processor) mounted thereon. The processor is a complex device characterized by a certain hardware configuration, an instruction set, and specific timing relationships. Reduced to essentials, however, the processor can be viewed as a device that provides defined output signals on various of its pins in response to input signals on various of its pins according to a particular (albeit complex) protocol. A device is said to emulate the processor if it has a set of pins or terminals corresponding to those of the processor and provides output signals on its terminals in response to input signals on its terminals according to the same protocol as the processor.

Software development for the microcomputer is sometimes carried out using an in-circuit emulator (the emulator). The emulator is a separate computer system having an interface with terminals that correspond to the processor pins. A multi-conductor cable is connected to the interface terminals at one end and terminates in a plug which is inserted into the processor socket. The emulator plug's pins correspond to the processor's pins. The emulator computer emulates the processor and effectively substitutes itself for the processor (which was removed from its socket or was never inserted into it). The emulator computer has various capabilities beyond that of the processor, and thus provides the software developer with a broad range of diagnostic features.

A problem with using an emulator is that it requires a socket-mounted (removable) processor. Regrettably, socketed technology is more expensive and potentially less reliable than other technologies (including surface-mount technology) where the processor pins are soldered directly to the circuit board.

SUMMARY OF THE INVENTION

The present invention provides the capability of in-circuit emulation of a processor that is mounted on a circuit board.

According to the invention, the processor is provided with isolation circuitry wherein a particular input signal regime causes all processor outputs to be disabled. The emulator cable terminates in a set of contacts configured to engage the processor pins. In the special case of a surface-mount processor, the contacts are mounted on a spring loaded test clip that fits over and around the processor. Provision is made, typically via at least one of the contacts, to establish the specific input signal regime at the appropriate processor pins in order to isolate the processor pins from any processor output signals. This prevents any processor output signals from reaching the emulator or the rest of the board logic, thereby allowing the emulator to operate.

In one embodiment, the processor has a single ISOLATE* pin, and the processor remains in the isolated state so long as a signal is asserted and communicated to the ISOLATE pin. In another embodiment, the processor includes a number of test pins and decoding circuitry configured so that a particular combination of inputs on the test pins causes the processor to be isolated.

Thus it can be seen that the present invention makes it possible to provide in-circuit emulation of a processor without removing the processor from the circuit board, so long as the processor pins are accessible. Accordingly, it is now possible to provide in-circuit emulation for most, if not all processors.

A further understanding of the nature and advantages of the present invention may be realized by reference to the remaining portions of the specification and drawings.

DESCRIPTION OF SPECIFIC EMBODIMENTS

The present invention is drawn to a technique for using an in-circuit emulator to emulate a particular microprocessor (the target processor) within a system (the target system).

Figure 1A:
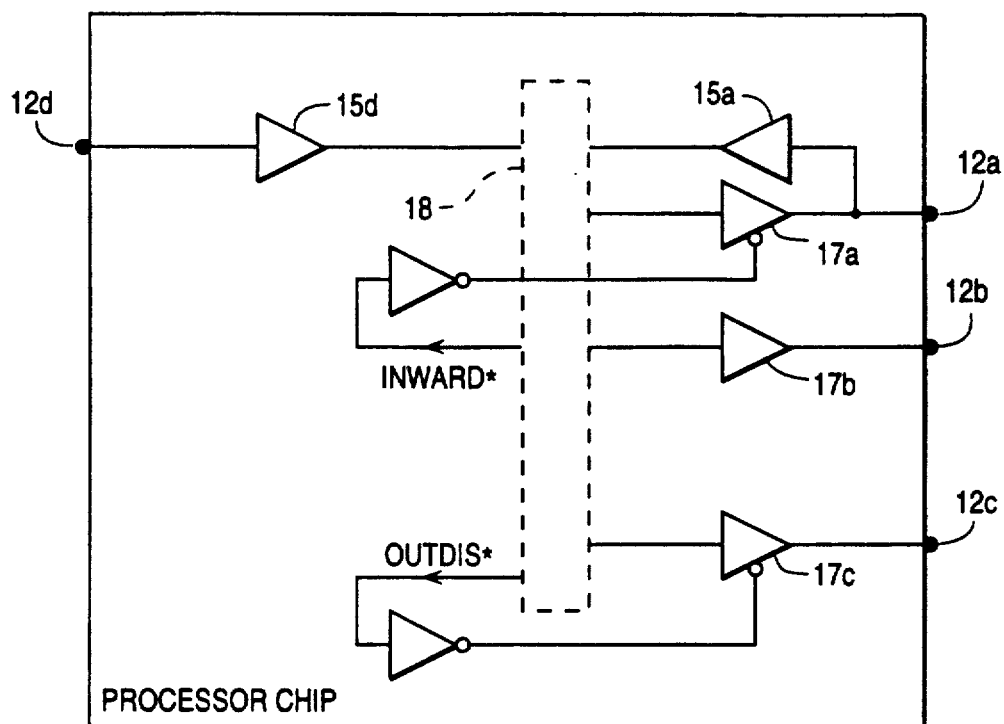
FIG. 1A is a simplified circuit schematic showing the input and output drivers of a typical processor chip.

FIG. 1A is a simplified circuit schematic showing the input and output buffer circuitry in a processor chip 10. Only a fraction of the processor signal pins are shown, including a bidirectional pin 12a, a normally driven output pin 12b, a tri-state output pin 12c, and an input pin 12d. An actual processor would have many more signal pins, as well as power ($V_{cc}$) and ground pins. For example, an Intel 80286 microprocessor has a total of 68 pins while an Intel 80386 microprocessor has a total of 132 pins.

Bidirectional pin 12a has an associated input buffer 15a and an associated output buffer 17a. Output pins 12b and 12c have respective associated output buffers 17b and 17c. Input pin 12d has an associated input buffer 15d. Output buffers 17a, 17b, and 17c and input buffers 15a and 15b are coupled between their respective pins and on-chip circuitry, shown as a rectangle 18 drawn in phantom. On-chip circuitry 18, which defines the particular microprocessor, is not part of the present invention and will not be described. For purposes of the present invention, it is sufficient to view processor 20 as a device that provides defined output signals on various of its pins in response to input signals on various of its pins according to a particular protocol.

Output buffer 17a is selectively disabled by an internal signal INWARD* (active low in specific embodiment) to present a high impedance at its output and thus allow the processor to receive data on pin 12a. Output pin 12b is normally driven high or low by output buffer 17b. Output buffer 17c is selectively disabled by an internal signal OUTDIS* (active low) to present a high impedance at output pin 12c. Input buffers 15a and 15d are normally enabled.

Figure 1B:
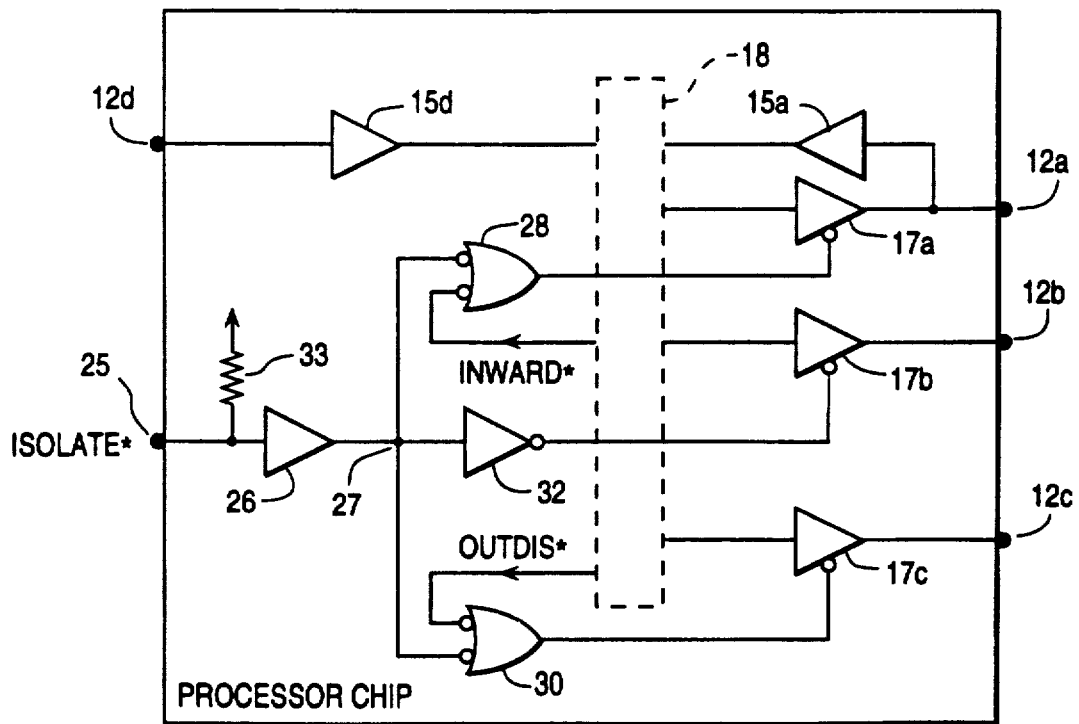
FIG. 1B is a simplified circuit schematic of the processor of FIG. 1A, provided with isolation circuitry suitable for use with the present invention.

FIG. 1B shows a corresponding processor 20, modified by having been provided with additional isolation circuitry. In addition to pins 12a–d with their associated input and output buffers as described above, processor 20 includes an input pin 25 that responds to an externally generated ISOLATE* signal (active low) by unconditionally disabling output buffers 17a, 17b and 17c. Pin 25 is coupled via an input buffer 26 to an internal node 27 through which it is coupled through other circuit elements to the output enables of the output buffers. More specifically, ISOLATE* is logically combined at a gate 28 with INWARD* so that either signal may disable output buffer 17a. Similarly, ISOLATE* is logically combined at a gate 30 with OUTDIS* so that either may disable output buffer 17c. Additionally, ISOLATE* is inverted at an inverter 32 so that it can disable output buffer 17b. ISOLATE* pin 25 is pulled high by an on-chip resistor 33 so that in the absence of a signal driving pin 25, the output buffers remain enabled unless disabled by other signals such as INWARD* and OUTDIS*.

Figure 1C:
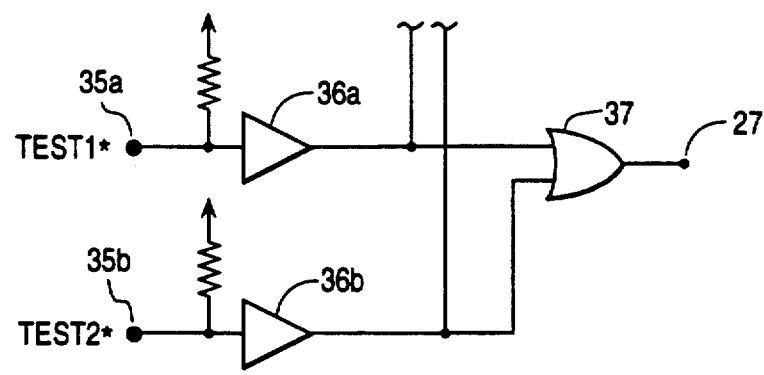
FIG. 1C is a logic schematic showing alternative isolation circuitry.

FIG. 1C is a fragmentary circuit schematic of an alternative embodiment for the isolation circuitry. In this embodiment, the processor is not provided with a single dedicated ISOLATE pin, but rather is provided with a number of test pins used for various test purposes, wherein the combination of input values specifies the particular operation. In the specific embodiment shown, a pair of test pins 35a and 35b receive test signals TEST1* and TEST2*. The test signals communicate via input buffers 36a and 36b to decoding circuitry, a portion of which is shown. Specifically, a gate 37 drives node 27 low when TEST1* and TEST2* are both active (low), which disables the output buffers as in the embodiment of FIG. 1B.

Figure 2:
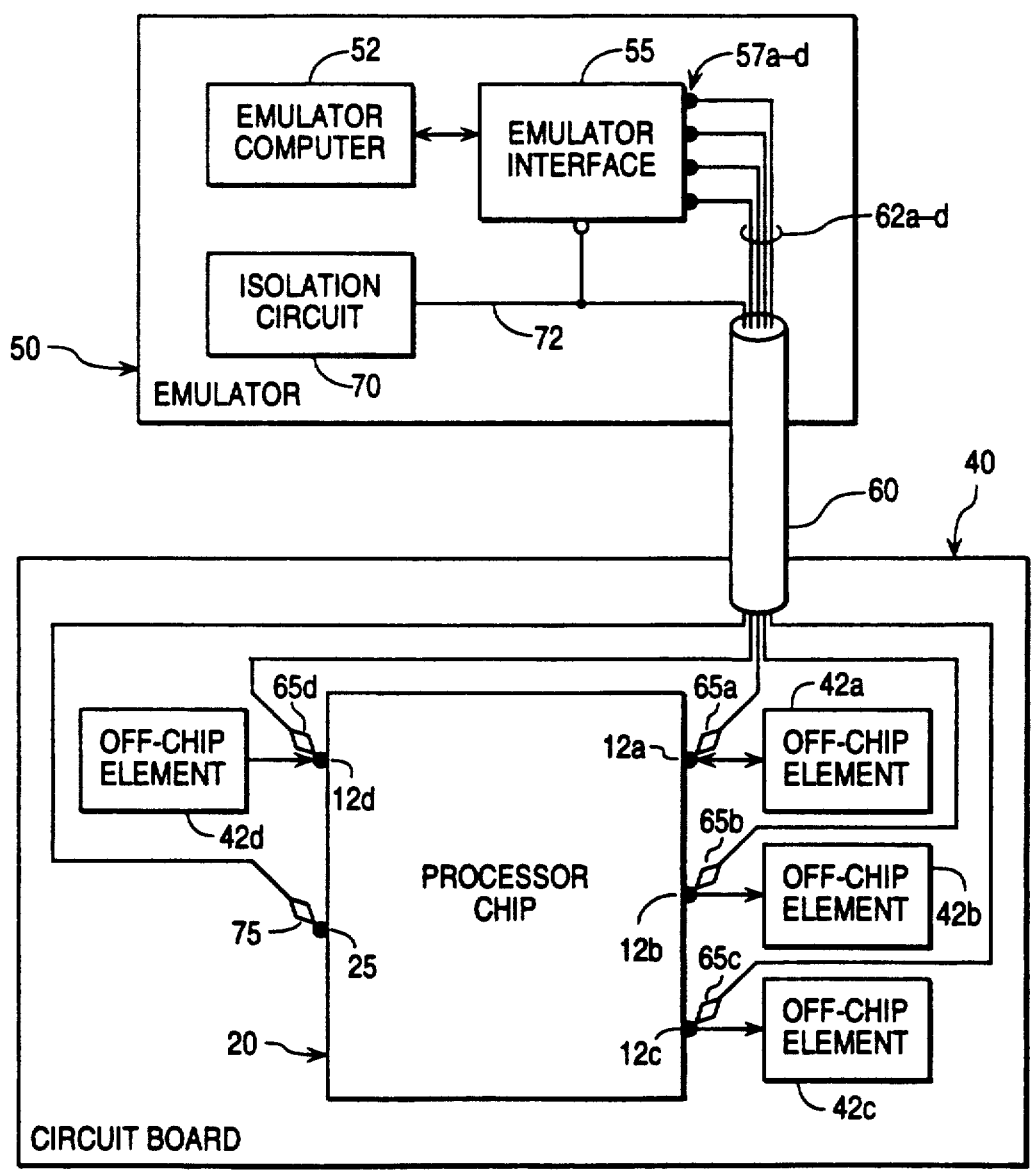
FIG. 2 is a block diagram illustrating the present invention.

FIG. 2 is block diagram illustrating in-circuit emulation of processor 20 with processor 20 mounted to a circuit board 40. The processor is shown as having pins 12a–b and isolation pin 25 as shown in FIG. 1B. As noted above, this is a simplified view. Pins 12a–12d are shown as connected to respective off-chip blocks 42a–d which may be passive circuit elements, active circuit elements, or connectors.

An in-circuit emulator 50 (referred to as the emulator) includes an emulator computer 52 coupled to an emulator interface 55. Emulator interface 55 has a set of emulator terminals 57a–d that correspond to pins 12a–d on processor 20. Emulator computer 52 receives signals that are communicated to the input terminals on the emulator interface and generates signals that are driven on the output terminals of the emulator interface according to the same protocol that characterizes processor 20. A cable 60 contains conductors 62a–d coupled at respective first ends to emulator terminals 57a–d. The cable terminates in a set of contacts 65a–d coupled to respective second ends of conductors 62a–d. The contacts are mounted and configured so that the contact for a given conductor engages the processor pin corresponding to the emulator interface terminal for that conductor.

An isolation circuit 70 provides an ISOLATE* signal that is supplied to the ISOLATE* pin of processor 20 via a conductor 72 which terminates in a contact 75. Typically, conductor 72 is one of the conductors in cable 60 and contact 75 is mounted on the same structure as the other contacts. As illustrated, the ISOLATE* signal enables emulator interface 55 so that the emulator is not connected to the processor pins until the processor has had its output pins isolated from the processor.

One of the input signal pins receives signals from an external clock. In general, the emulator will use that clock. In addition to the signal pins, the processor has several pins for power ($V_{cc}$) and ground as supplied by the target system power supply. The emulator has its own power supply and ground. In a typical configuration, the emulator ground and the target system ground are connected through conductors to the target processor's ground pins. The target system power supply typically continues to supply the target system, while the emulator senses the target system $V_{cc}$ through conductors to the target processor's $V_{cc}$ pins.

The form of the contacts and their supporting structure depends on the packaging technology used for processor 20. One representative type of packaging is surface mount technology using plastic leaded chip carrier (PLCC) packages. In this technology the pins extend outwardly from the periphery of the processor package, are bent downward (perpendicular to the plane of the board), and then are bent either outwardly or inwardly to be soldered to pads on the board. The pins are thus all accessible at the sides of the processor package. An AP Products surface mount test clip, available from 3M Electronics Products Division, located at 9450 Pine Needle Drive, P.O. Box 540, Mentor, Ohio 44061, can be used. Part No. 923675-68 is a test clip having 68 contacts adapted to engage the pins of a standard 68-pin PLCC package. In this type of test clip, the contacts are mounted on a structure that fits over and around the processor and are urged by springs into engagement with the exposed portions of the pins along the edges of the processor package.

Another common type of packaging is a pin grid array (PGA) configuration in which the pins extend perpendicularly away from the bottom face of the package in a rectangular array. In a 132-pin, cavity down PGA configuration, the pins are 3-deep in from the perimeter. Since the pins extend from the underside of the chip, they are not accessible to the contacts unless they extend through the circuit board, in which case it should be possible to make contact on the other side of the board.

In conclusion, it can be seen that the present invention provides a technique for in-circuit emulation of a processor without removing the processor from the circuit board.

While the above is complete description of a specific embodiment of the invention, various modification, alternative and equivalents may be used. For example, while the processor is shown as having only its output buffers disabled by the ISOLATE* signal, it would be possible to have the input buffers disabled as well. Moreover, in the event that the processor is in a package that does not allow direct engagement with the pins, it may be possible to provide circuit board connections between the processor pins and a standard connector, and have the cable from the emulator terminate in a complementarily configured connector.

Therefore, the above description and illustrations should not be taken as limiting the scope of the invention which is defined by the appended claims.

What is claimed is:

1. Apparatus for in-circuit emulation of a microprocessor chip on a circuit board, wherein the microprocessor has set a microprocessor terminals and operates to provide defined output signals on various ones of the microprocessor terminals in response to input signals on various ones of the microprocessor terminals according to a particular protocol, and wherein the microprocessor includes isolation circuitry that operates in response to a specific input signal regime on the microprocessor terminals to isolate the microprocessor terminals from any output signals that the microprocessor generates, the apparatus comprising:

in-circuit emulator means, including an interface having a set of emulator terminals that correspond to the microprocessor terminals, for emulating the operation of the microprocessor chip by providing output signals on various of the emulator terminals in response to input signals on various of the emulator terminals according to the same protocol as the microprocessor;

means for coupling the emulator terminals to respective corresponding ones of the microprocessor terminals; and means for establishing the specific input signal regime at the microprocessor terminals so as to isolate the microprocessor terminals from any output signals that the microprocessor generates when the emulator terminals are coupled to the microprocessor terminals.

2. The apparatus of claim 1 wherein the means for coupling comprises:

a set of contacts configured to directly engage the microprocessor terminals; and a set of conductors connecting the emulator terminals to the contacts.

3. The apparatus of claim 1 wherein:

the microprocessor includes a single dedicated isolate terminal and the microprocessor's isolation circuitry is coupled thereto;

the specific input signal regime is that a signal be continuously asserted at the microprocessor's isolate terminal; and the means for establishing comprises means for continuously asserting the signal and communicating the signal to the microprocessor's isolate terminal.

4. The apparatus of claim 1 wherein:

the microprocessor includes a plurality of test terminals and the microprocessor's isolation circuitry is coupled to the test terminals;

the specific input signal regime is that a specific combination of input signals be asserted at the test terminals; and the means for establishing comprises means for asserting the specific combination of input signals to the microprocessor's test terminals.

5. A method for in-circuit emulation of a microprocessor chip on a circuit board, wherein the microprocessor has a set of microprocessor terminals and operates to provide defined output signals on various ones of the microprocessor terminals in response to input signals on various ones of the microprocessor terminals according to a particular protocol, and wherein the microprocessor includes isolation circuitry that operates in response to a specific input signal regime to isolate the microprocessor terminals from any output signals that the microprocessor generates, the method comprising the steps of:

establishing the specific input signal regime at the microprocessor terminals so as to isolate the microprocessor terminals from any output signals that the microprocessor generates;

providing an emulator having a set of emulator terminals that correspond to the microprocessor terminals;

coupling the emulator terminals to respective corresponding ones of the microprocessor terminals; and providing output signals on various of the emulator terminals in response to input signals on various of the emulator terminals according to the same protocol as the microprocessor.

6. The method of claim 5 wherein said coupling step includes directly engaging the microprocessor terminals.

7. The apparatus of claim 2 wherein:

the set of conductors forms a first part of a cable;

the means for establishing comprises at least one additional contact and at least one additional conductor; and the additional conductor forms a second part of the cable.

8. Apparatus for in-circuit emulation of a microprocessor chip on a circuit board, wherein the microprocessor has a set of microprocessor terminals and includes isolation circuitry that operates in response to a specific input signal regime to isolate the microprocessor terminals from any output signals that the microprocessor generates, the apparatus comprising:

in-circuit emulator means, including an interface having a set of emulator terminals that correspond to the microprocessor terminals, for emulating the operation of the microprocessor chip;

external isolation means for generating at least one signal representing the specific input signal regime; and a cable for coupling the emulator terminals and the external isolation means to the microprocessor terminals.

9. The apparatus of claim 8 wherein:

the microprocessor includes a single dedicated isolate terminal and the microprocessor's isolation circuitry is coupled thereto;

the specific input signal regime is that a signal be continuously asserted at the microprocessor's isolate terminal;

the external isolation means comprises means for continuously asserting the signal; and the cable includes a conductor that communicates the signal from the external isolation means to the microprocessor's isolate terminal.

10. The apparatus of claim 8 wherein:

the microprocessor includes a plurality of test terminals and the microprocessor's isolation circuitry is coupled to the test terminals;

the specific input signal regime is that a specific combination of input signals be asserted at the microprocessor's test terminals;

the external isolation means comprises means for asserting the specific combination of signals; and the cable includes conductors that communicate the specific combination of signals from the external isolation means to the microprocessor's test terminals.

\* \* \* \* \*